United States Patent
Wang

(10) Patent No.: US 10,430,207 B2
(45) Date of Patent: Oct. 1, 2019

(54) METHOD AND ELECTRONIC DEVICE FOR DIRECTLY STARTING APPLICATION ON SECOND VIRTUAL MACHINE IN OPERATING ENVIRONMENT OF FIRST VIRTUAL MACHINE

(71) Applicant: CLOUDMINDS (SHENZHEN) ROBOTICS SYSTEMS CO., LTD., Beijing (CN)

(72) Inventor: Yonghui Wang, Beijing (CN)

(73) Assignee: CLOUDMINDS (SHENZHEN) ROBOTICS SYSTEMS CO., LTD., Beijing (CN)

( * ) Notice: Subject to any disclaimer, the term of this patent is extended or adjusted under 35 U.S.C. 154(b) by 156 days.

(21) Appl. No.: 15/652,609

(22) Filed: Jul. 18, 2017

(65) Prior Publication Data
US 2017/0315829 A1   Nov. 2, 2017

Related U.S. Application Data

(63) Continuation of application No. PCT/CN2016/077334, filed on Mar. 25, 2016.

(51) Int. Cl.
*G06F 9/455* (2018.01)
*G06F 9/445* (2018.01)
(Continued)

(52) U.S. Cl.
CPC ........... *G06F 9/44505* (2013.01); *G06F 8/61* (2013.01); *G06F 9/445* (2013.01); *G06F 9/455* (2013.01);
(Continued)

(58) Field of Classification Search
None
See application file for complete search history.

(56) References Cited

U.S. PATENT DOCUMENTS

| 7,681,134 B1 | 3/2010 | Grechishkin et al. |
| 7,788,593 B1 | 8/2010 | Grechishkin et al. |

(Continued)

FOREIGN PATENT DOCUMENTS

| AU | 2009257865 A1 | 12/2009 |
| BR | PI0911610 A2 | 10/2015 |

(Continued)

OTHER PUBLICATIONS

Written Opinion dated Dec. 28, 2016; PCT/CN2016/077334.
(Continued)

*Primary Examiner* — Van H Nguyen

(57) ABSTRACT

A first virtual machine of a device receives startup information and creates a startup identifier associated with the startup information. The device receives, a startup instruction for starting an application on a second virtual machine via the first virtual machine, then acquires startup information corresponding to the startup instruction, the startup information including information of the second virtual machine and information of the application on the second virtual machine. The device starts the second virtual machine according to the information of the second virtual machine; and starts the application on the second virtual machine according to the information of the application on the second virtual machine.

16 Claims, 10 Drawing Sheets

(51) Int. Cl.
*G06F 8/61* (2018.01)
*G06F 9/48* (2006.01)

(52) U.S. Cl.
CPC .......... *G06F 9/45558* (2013.01); *G06F 9/485* (2013.01); *G06F 9/45554* (2013.01); *G06F 2009/45562* (2013.01); *G06F 2009/45575* (2013.01); *G06F 2009/45587* (2013.01)

(56) References Cited

U.S. PATENT DOCUMENTS

| | | | |
|---|---|---|---|
| 7,975,236 | B1 | 7/2011 | Grechishkin et al. |
| 7,987,432 | B1 | 7/2011 | Grechishkin et al. |
| 8,010,495 | B1 | 8/2011 | Kuznetzov et al. |
| 8,117,554 | B1 | 2/2012 | Grechishkin |
| 8,185,893 | B2 * | 5/2012 | Hyser .................. G06F 9/5027 718/1 |
| 8,286,152 | B2 * | 10/2012 | Grcevski ............. G06F 9/45533 717/140 |
| 8,387,048 | B1 | 2/2013 | Grechishkin |
| 8,732,607 | B1 | 5/2014 | Grechishkin |
| 8,910,163 | B1 | 12/2014 | Grechishkin et al. |
| 9,081,596 | B2 * | 7/2015 | Maeda ................... G06F 21/53 |
| 9,317,195 | B1 | 4/2016 | Grechishkin et al. |
| 2006/0005188 | A1 | 1/2006 | Vega et al. |
| 2006/0010433 | A1 | 1/2006 | Neil |
| 2009/0313620 | A1 | 12/2009 | Sedukhin et al. |
| 2012/0159482 | A1 | 6/2012 | Jeong |
| 2012/0180049 | A1 | 7/2012 | Tsai |
| 2012/0185799 | A1 | 7/2012 | Tsai |
| 2012/0310888 | A1 | 12/2012 | Kuznetzov |
| 2014/0075438 | A1 * | 3/2014 | He .......................... H04L 67/08 718/1 |
| 2014/0372503 | A1 | 12/2014 | Wang |

FOREIGN PATENT DOCUMENTS

| | | | |
|---|---|---|---|
| CA | 2723907 | A1 | 12/2009 |
| CN | 1716205 | A | 1/2006 |
| CN | 102057355 | A | 5/2011 |
| CN | 102662741 | A | 9/2012 |
| CN | 102968342 | A | 3/2013 |
| EA | 201201060 | A1 | 12/2013 |
| EP | 1622014 | A2 | 2/2006 |
| EP | 2310940 | A1 | 4/2011 |
| EP | 2811404 | A1 | 12/2014 |
| EP | 3125113 | A1 | 2/2017 |
| JP | 2006-018813 | A | 1/2006 |
| JP | 2006018813 | A | 1/2006 |
| JP | 2011-524053 | A | 8/2011 |
| JP | 2011524053 | A | 8/2011 |
| JP | 4806212 | B2 | 11/2011 |
| JP | 5367074 | B2 | 12/2013 |
| KR | 20060047772 | A | 5/2006 |
| KR | 20110030447 | A | 3/2011 |
| RU | 2010150809 | A | 6/2012 |
| TW | 201229910 | A | 7/2012 |
| WO | 2009/151875 | A1 | 12/2009 |
| WO | 2009151875 | A1 | 12/2009 |
| WO | 2013149473 | A1 | 10/2013 |

OTHER PUBLICATIONS

Supplementary European search report and European search opinion dated Mar. 22, 2018; EP 16877914.8.
Office Action dated May 22, 2018; JP 2017-540903.

* cited by examiner

METHOD AND ELECTRONIC DEVICE FOR DIRECTLY STARTING APPLICATION ON SECOND VIRTUAL MACHINE IN OPERATING ENVIRONMENT OF FIRST VIRTUAL MACHINE

CROSS-REFERENCE TO RELATED APPLICATIONS

This application is a continuation of International Application No. PCT/CN2016/077334, with an international filing date of Mar. 25, 2016, the entire contents of all of which are incorporated herein by reference.

TECHNICAL FIELD

The present disclosure relates to the technical field of virtualization, and in particular, relates to a method and an electronic device for starting an application.

BACKGROUND

Mobile terminals have become an important tool in user's daily life and work. With dramatic advancements of the mobile Internet with the presence of mobile terminals, the security issue of the mobile terminals is becoming more and more severe, which is extensively concerned in the whole society. Mobile virtualization allows a plurality of operating systems or virtual machines to simultaneously run on one mobile phone or wireless handheld device. By means of the virtualization technology, a user, with no need to use two or more mobile devices, may access a plurality of virtual machines or operating systems on a single physical device. The virtualization technology has notable characteristics in the aspect of security. Through isolation achieved by the virtualization technology, a plurality of operating systems are isolated on a single-terminal, and thus processes running in the operating systems are prevented from causing adverse impacts to other operating systems. A typical application scenario is to achieve isolation of an enterprise system and a personal system on a mobile device such as a mobile phone by using the virtualization technology, prevent latent risks caused by processes in the personal system to the enterprise system, and accommodate requirements imposed on Bring Your Own Device (BYOD) by some enterprises having security requirement.

A hardware system is configured on the bottom layer of a virtualization architecture system, which mainly includes a processor, a memory, an input and output device and the like. A virtualization layer running software is configured over the hardware system, wherein the virtualization layer runs a virtual machine monitor (which is referred to as a VMM or a hypervisor). The hypervisor is mainly responsible for managing the actual physical hardware platform, and providing a corresponding virtualized hardware platform for each client. The hypervisor practices the above functions by using a host.

FIG. 1 is a schematic diagram of a virtualization system in the prior art. The system includes three virtual machines. Each virtual machine may be considered to be a small but complete computer system which has its own "system hardware", including its own processor, memory and input and output device, and an operating system (Guest OS), for example, Android, Windows, Linux or the like, of a virtual machine runs on a computer system of the virtual machine. A user may switch between the virtual machines to isolate use of different applications on the virtual machines. When the terminal operates in an operating system of virtual machine if the user needs to start an application on another virtual machine (for example, virtual machine 2), a conventional switching method is: firstly closing the operating system of virtual machine 1, and starting an operating system of virtual machine 2 from the host, to find the application and then start the application; or manually switching to the operating system of virtual machine 2 to find the application and start the application.

SUMMARY

An embodiment of the present disclosure provides a method for starting an application. The method includes:

receiving, by a first virtual machine, startup information and creating a startup identifier associated with the startup information;

receiving, via the first virtual machine, a startup instruction for starting an application on a second virtual machine;

acquiring startup information corresponding to the startup instruction, the startup information including information of the second virtual machine and information of the application on the second virtual machine;

starting the second virtual machine according to the information of the second virtual machine; and starting the application on the second virtual machine according to the information of the application on the second virtual machine;

wherein the receiving, via the first virtual machine, a startup instruction for starting an application on a second virtual machine includes:

receiving, via the first virtual machine, a startup instruction for starting the application on the second virtual machine that is generated after the startup identifier is triggered;

wherein the receiving, by a first virtual machine, startup information includes:

determining, by a virtualization layer host, the startup information; and receiving, by the first virtual machine, the startup information sent by the virtualization layer host.

Another embodiment of the present disclosure provides an electronic device for starting an application. The electronic device including:

at least one processor; and a memory communicably connected with the at least one processor and storing one or more programs executable by the at least one processor, the one or more programs including:

a startup information receiving module, configured to receive the startup information; and a startup identifier creating module, configured to create a startup identifier associated with the startup information;

a startup instruction receiving module, configured to receive, via a first virtual machine, a startup instruction for starting an application on a second virtual machine;

a startup information acquiring module, configured to acquire startup information corresponding to the startup instruction, the startup information including information of the second virtual machine and information of the application on the second virtual machine;

a virtual machine starting module, configured to start the second virtual machine according to the information of the second virtual machine; and an application starting module, configured to start the application on the second virtual machine according to the information of the application on the second virtual machine;

wherein the startup instruction receiving module is further configured to receive, via the first virtual machine, a startup instruction for starting the application on the second virtual machine that is generated after the startup identifier is triggered; and the startup information receiving module, the startup identifier creating module and the startup instruction receiving module are located on the first virtual machine;

wherein the one or more programs further includes:

a first startup information determining module, configured to determine the startup information; wherein the first startup information determining module is located on a virtualization layer host; and the startup information receiving module is further configured to receive the startup information sent by the first startup information determining module.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION

To make the technical solutions and advantages of the present disclosure clearer and more understandable, exemplary embodiments of the present disclosure are described in detail hereinafter with reference to the accompanying drawings. Apparently, the described embodiments are merely a part of embodiments of the present disclosure, instead of all the embodiments of the present disclosure. It should be noted that in cases of no conflict, the embodiments and features in the embodiments of the present disclosure may be combined together.

The inventors have identified during practice of the disclosure that: In the prior art, a terminal may run a plurality of virtual machines, and a user may switch between the virtual machines to isolate use of different applications on the virtual machines. However, cross-virtual machine startup of an application requires multiple steps that the user switches the virtual machines and finds the application, and therefore, the process is complicated. Particularly in a case of different applications on different virtual machines, manual switches between various virtual machines are needed. In this case, startup and close of operating systems consume a lot of the user, such that the operations are difficult for the user and inconvenience is caused to the user.

With respect to the above defects, embodiments of the present disclosure provide a technical solution of: receiving, via a first virtual machine, a startup instruction for starting an application on a second virtual machine, and acquiring startup information corresponding to the startup instruction, the startup information including information of the second virtual machine and information of the application on the second virtual machine; and starting the second virtual machine according to the information of the second virtual machine, and starting the application on the second virtual machine according to the information of the application on the second virtual machine. With this technical solution, the user may directly start the application on the second virtual machine in an operating environment of the first virtual machine, with no need to switch the operating systems and find the application. Therefore, the operations are convenient for the user.

In the present disclosure, the first virtual machine and the second virtual machine are virtual machines running on the same virtualized layer, wherein the virtualized layer may further run one or more other virtual machines. The first virtual machine, the second virtual machine and the one or more other virtual machines (if available) and the virtualized layer both run in the same device, or run in a device system formed of a plurality of physical devices.

For case of practice of the present disclosure, description is given hereinafter with reference to examples.

Figure 2:
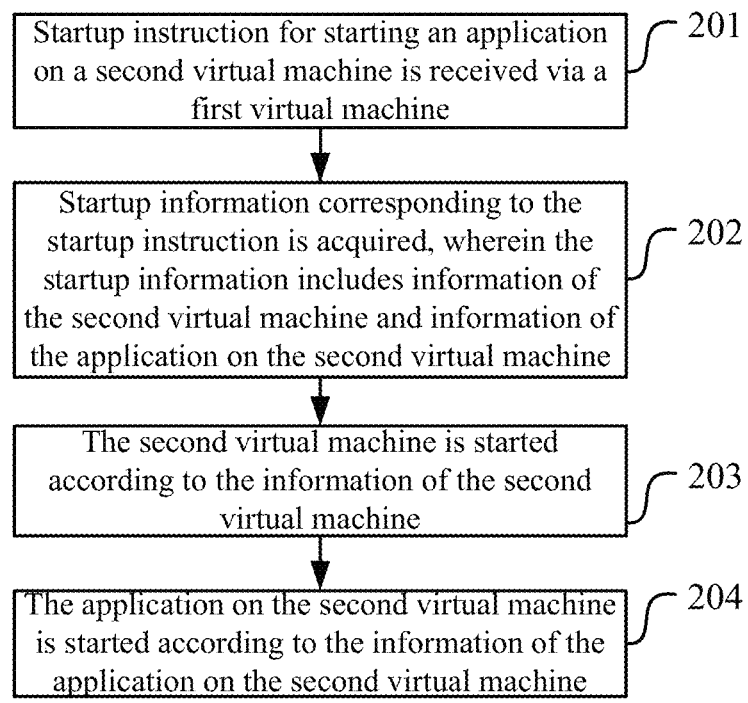
FIG. 2 illustrates a schematic flowchart of a method for starting an application according to an embodiment of the present disclosure.

FIG. 2 illustrates a schematic flowchart of a method for starting an application according to Embodiment 1 of the present disclosure. As illustrated in FIG. 2, the method includes the following steps:

Step 201: A startup instruction for starting an application on a second virtual machine is received via a first virtual machine.

In step 201, the device receives a startup instruction for starting an application on a second virtual machine via a first virtual machine. The startup instruction herein is received via a hardware user interface, for example, a touch screen, a keyboard, a mouse click or the like, wherein the hardware user interface is a related hardware that is to be called by the first virtual machine. The startup instruction is directed to starting an application on the second virtual machine, that is, acquiring a startup instruction for starting an application of another virtual machine from the first virtual machine.

Figure 1:
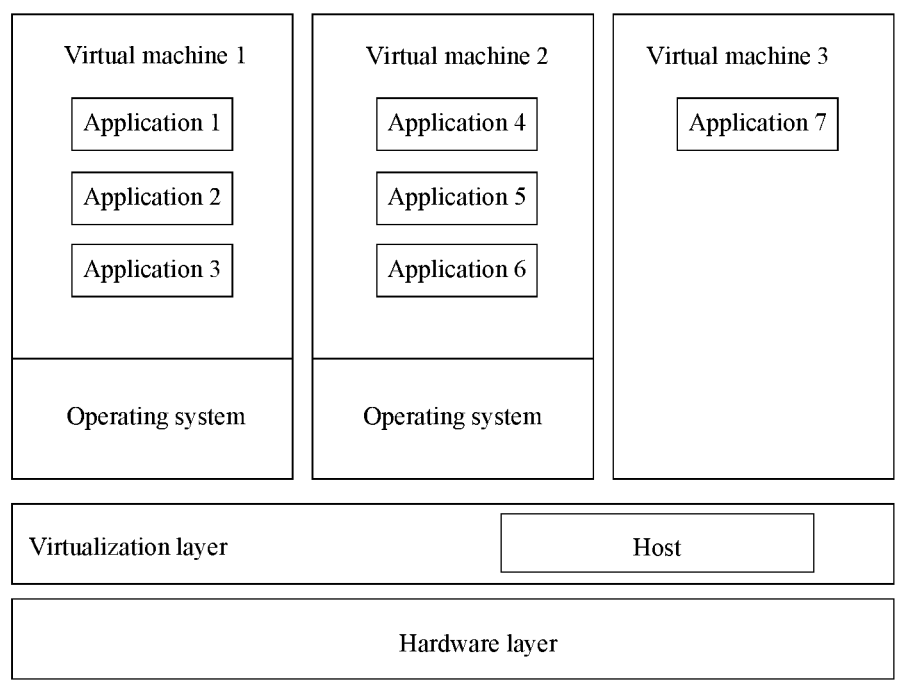
FIG. 1 illustrates a schematic architecture diagram of a virtualization system in the prior art.

The second virtual machine may run an operating system, and the application runs in the operating system (that is, similar to the form of virtual machine 1 and virtual machine 2 as illustrated in FIG. 1); or the second virtual machine does not run an operating system, but is directly configured with a running environment of the application, and the virtual machine is used for dedicatedly running the application (that is, similar to the form of virtual machine 3 as illustrated in FIG. 1).

Step 202: Startup information corresponding to the startup instruction is acquired, wherein the startup information includes information of the second virtual machine and information of the application on the second virtual machine.

In step 202, upon receiving the startup instruction, the device acquires corresponding startup information according to the startup instruction. That is, after a startup instruction from a user for starting an application on the second virtual machine, startup information of the application is acquired. The startup information herein is stored in the first virtual machine, and includes information of the second virtual machine corresponding to the startup instruction and information of the application on the second virtual machine. The startup information needs to simultaneously include related information of the second virtual machine and the application, such that the device is capable of acquiring the related information at one time, and constantly starting the second virtual machine and the application running on the second virtual machine.

Preferably, the information of the second virtual machine includes an identifier of the second virtual machine or a startup parameter of the second virtual machine.

Preferably, the information of the application on the second virtual machine includes an identifier of the application or execution information of the application.

Step 203: The second virtual machine is started according to the information of the second virtual machine.

In step 203, the second virtual machine is started according to the information of the second virtual machine acquired in step 202. When the information of the second virtual machine includes an identifier of the second virtual machine, the device needs to determine, according to the identifier, that the second virtual machine needs to be started, and correspondingly acquires a startup parameter of the second virtual machine to implement startup of the second virtual machine. In this case, the information of the second virtual machine that needs to be stored on the first virtual machine is more concise, but the time elapsed for starting the virtual machine may be longer. When the information of the second virtual machine includes a startup parameter of the second virtual machine, the second virtual machine may be directly started. In this case, the information of the second virtual machine that needs to be stored on the first virtual machine may be more abundant and occupies a larger memory, but the time elapsed for starting the virtual machine may be shorter, and there is no need to match the related startup parameter for each startup.

Step 204: The application on the second virtual machine is started according to the information of the application on the second virtual machine.

In step 204, the application on the second virtual machine is started according to the information of the application on the second virtual machine acquired in step 202. When the information of the application on the second virtual machine includes an identifier of the application, the device needs to determine, according to the identifier, which application on the virtual machine needs to be started, and determines execution information of the application according to the identifier of the application, wherein the execution information includes an application name, an application path, an execution parameter and the like, such that the application on the second virtual machine is started according to the execution information of the application. In this case, the information of the second virtual machine that needs to be stored on the first virtual machine is more concise, but the time elapsed for starting the application may be longer. When the information of the application on the second virtual machine includes execution information of the application, the application on the second virtual machine may be directly started according to the execution information of the application. In this case, the information of the second virtual machine that needs to be stored on the first virtual machine may be more abundant and occupies a larger memory, but the time elapsed for starting the virtual machine may be shorter, and there is no need to match the related startup parameter for each startup.

The following beneficial effects are achieved: According to the present disclosure, a user is capable of directly starting the application on the second virtual machine in the operating environment of the first virtual machine, with no need to switch an operating system to find an application, and thus user's operations are convenient.

Figure 3:
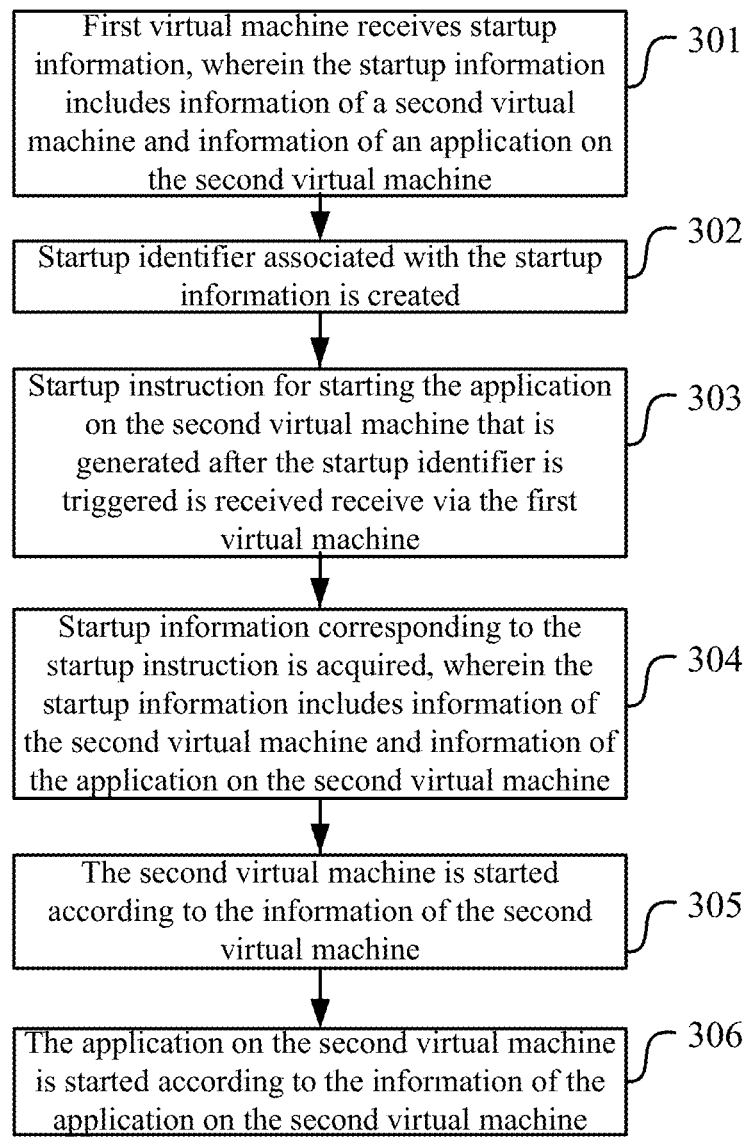
FIG. 3 illustrates a schematic flowchart of a method for starting an application according to an embodiment of the present disclosure.

FIG. 3 illustrates a schematic flowchart of a method for starting an application according to Embodiment 2 of the present disclosure. As illustrated in FIG. 3, the method includes the following steps:

Step 301: A first virtual machine receives startup information, wherein the startup information includes information of a second virtual machine and information of an application on the second virtual machine.

Step 302: A startup identifier associated with the startup information is created.

In some embodiments, steps 301 and 302 are used for creating, on the first virtual machine, a startup identifier for starting an application on the second virtual machine, such that a user may generate a startup instruction of the application on the second virtual machine by triggering the startup identifier.

In step 301, before the startup identifier is created, the first virtual machine needs to firstly receive startup information of the application on the second virtual machine, and store the received startup information in a memory associated with the first virtual machine.

The startup information includes information of a second virtual machine and information of an application on the second virtual machine. The startup information needs to simultaneously include related information of the second virtual machine and the application, such that the device is capable of acquiring the related information at one time, and constantly starting the second virtual machine and the application running on the second virtual machine.

Preferably, the information of the second virtual machine includes an identifier of the second virtual machine or a startup parameter of the second virtual machine.

Preferably, the information of the application on the second virtual machine includes an identifier of the application or execution information of the application.

In step 302, a startup identifier associated with the startup information is created according to the startup information of the application on the second virtual machine received in step 301, wherein the startup identifier is presented to the user via a display screen, a touch display screen or the like hardware device of the device. In practice, the startup identifier may be a shortcut icon, an option in a menu bar, or a widget. When the startup identifier created in step 302 is triggered, a startup instruction for starting the application on the second virtual machine may be generated.

Preferably, the creating a startup identifier associated with the startup information includes: adding a tag of the second virtual machine to the startup identifier.

When an application is installed on the first virtual machine, a startup identifier of the application is present on the first virtual machine. In addition, the same application is also installed on the second virtual machine, and a startup identifier associated with startup information of the application on the second virtual machine is created on the first virtual machine. In the above cases, since each application generally has a fixed application identifier, in the display interface of the first virtual machine, the startup identifier of the application on the first virtual machine is hard to be distinguished from the startup identifier of the application on the second virtual machine. In view of this problem, when the startup identifier associated with the startup information of the application on the second virtual machine is created, a tag of the second virtual machine is added to the startup identifier.

Figure 4:
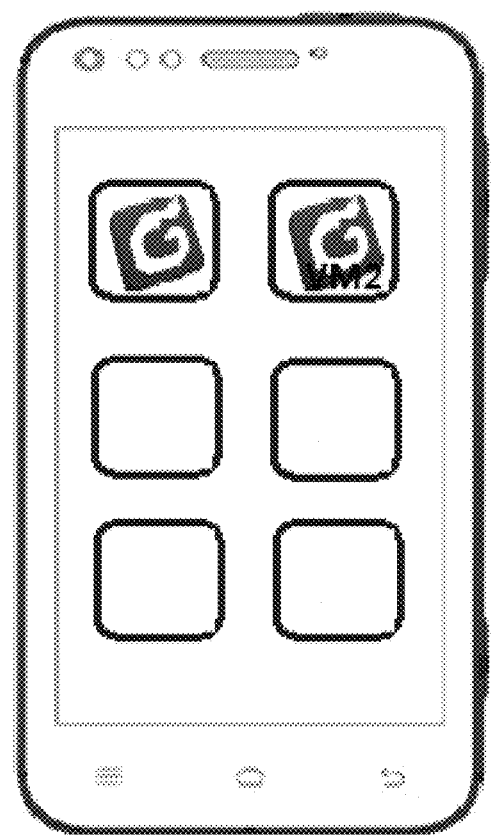
FIG. 4 illustrates a schematic diagram of a display interface of a first virtual machine according to an embodiment of the present disclosure.

FIG. 4 illustrates a schematic diagram of a display interface of a first virtual machine according to an embodiment. A Foxmail application is installed on both the first virtual machine and the second virtual machine, a startup identifier for running the Foxmail application on the second virtual machine is created on the first virtual machine, and a tag "VM2" of the second virtual machine is added to the startup identifier.

Adding a tag of the virtual machine for practically running the application to the startup identifier may help the user to simply determine the virtual machine that is practically run for each application.

Step 303: A startup instruction for starting the application on the second virtual machine that is generated after the startup identifier is triggered is received receive via the first virtual machine.

Step 304: Startup information corresponding to the startup instruction is acquired, wherein the startup information includes information of the second virtual machine and information of the application on the second virtual machine.

Step 305: The second virtual machine is started according to the information of the second virtual machine.

Step 306: The application on the second virtual machine is started according to the information of the application on the second virtual machine.

Steps 303 to 306 herein are similar to steps 201 to 204 in the above embodiment, and thus the identical portions are not described herein any further.

In some embodiments, steps 303 and 304 are performed by the first virtual machine, and the first virtual machine sends the startup information to a virtualization layer host upon acquiring the startup information; step 305 is performed by the virtualization layer host, and prior to step 306, the virtualization layer host sends the information of the application on the second virtual machine in the startup information to the second virtual machine; and step 306 is performed by the second virtual machine, and the second virtual machine starts the application upon acquiring the information of the application on the second virtual machine sent by the virtualization layer host.

Figure 5:
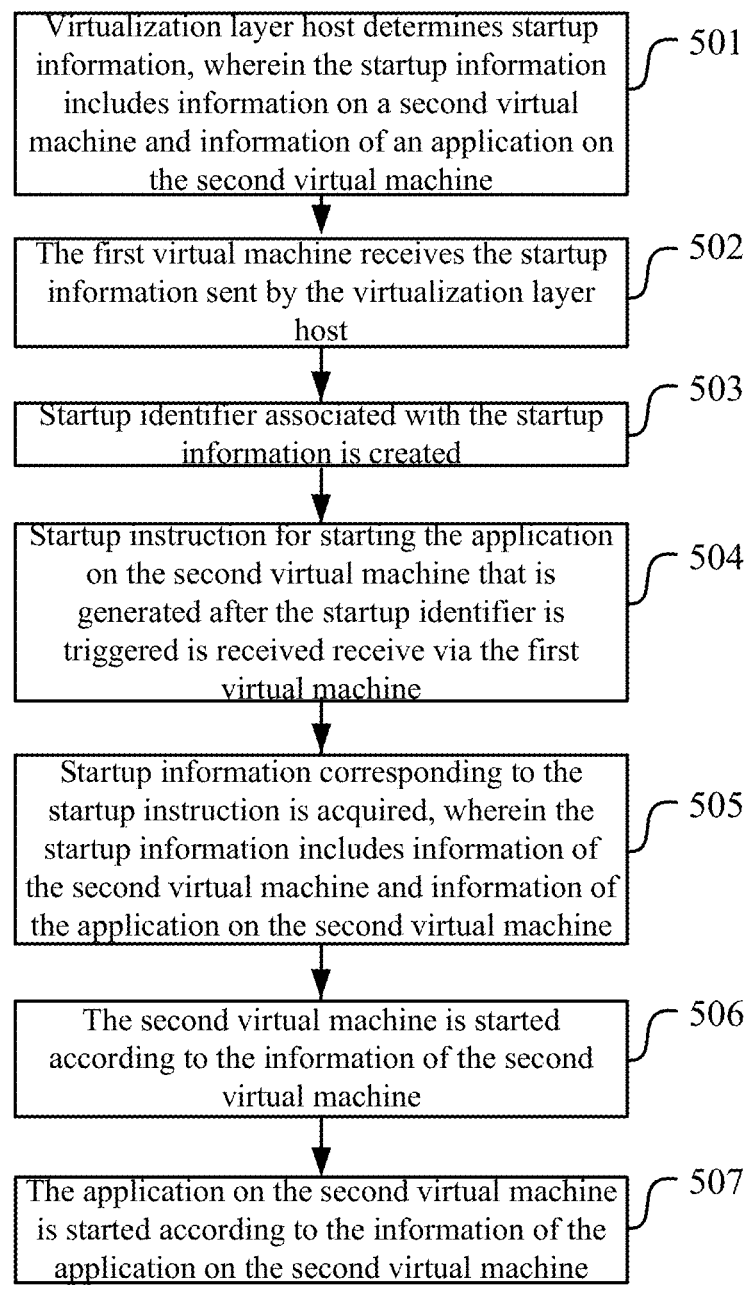
FIG. 5 illustrates a schematic flowchart of a method for starting an application according to an embodiment of the present disclosure.

FIG. 5 illustrates a schematic flowchart of a method for starting an application according to Embodiment 3 of the present disclosure. As illustrated in FIG. 5, the method includes the following steps:

Step 501: A virtualization layer host determines startup information, wherein the startup information includes information of a second virtual machine and information of an application on the second virtual machine.

In step 501, a user initiates a process for creating a startup identifier in an operating environment of a host running on a virtualization layer. A virtualization layer (hypervisor) in the virtualization architecture is capable of acquiring information of applications running on various virtual machines, including execution information of each of the applications, and information indicating on which virtual machine the application runs. Therefore, in the operating environment of the host, a user request is acquired, and it is determined for which application on a virtual machine a startup identifier is to be created on another virtual machine.

The startup information herein includes information of a second virtual machine and information of an application on the second virtual machine. The startup information needs to simultaneously include related information of the second virtual machine and the application, such that the first virtual machine is capable of acquiring the related information at one time sent by the virtualization layer host, and the device is capable of constantly starting the second virtual machine and the application running on the second virtual machine.

Preferably, the information of the second virtual machine includes an identifier of the second virtual machine or a startup parameter of the second virtual machine.

Preferably, the information of the application on the second virtual machine includes an identifier of the application or execution information of the application.

Preferably, the process of starting to initiate the course of creating a startup identifier includes:

receiving, by the virtualization layer host, first designation information, and determining the startup information according to the first designation information, the first designation information being configured to designate to create the startup identifier for the application.

The first designation information is used for designating for which application or for which application on which virtual machine a startup identifier is to be created on another virtual machine. That is, when the host runs a plurality of virtual machines, and one or a plurality of applications are installed on each virtual machine, the user may designate an application, such that the operations are more flexible. The first designation information may be acquired by the user by means of a selection or input operation in a pop-up dialog box, or by the user by means of designating a folder directory to batchwise designate applications under the folder directory (which facilitates subsequent batchwise acquisition of startup information of the applications in this installation directory). In some embodiments, the user selects an application running on a second virtual machine, and startup information of the application running on the second virtual machine is determined according to the selection information. The step of designating an application may be optional. For example, when the host runs only two virtual machines, a first virtual machine and a second virtual machine, and only one application is installed on the second virtual machine, it may be directly determined for which application on which virtual machine the startup identifier is to be created.

Preferably, step 5011 is performed prior to step 502.

Step 5011: Prior to the receiving, by the first virtual machine, the startup information sent by the virtualization layer host, the method further includes: receiving, by the virtualization layer host, first selection information, and selecting to create the startup identifier on the first virtual machine according to the first selection information.

In step 5011, the first selection information is used for selecting on which virtual machine the startup identifier is to be created, that is, when the host runs a plurality of virtual machines, the user may select on which virtual machine the startup identifier is to be created, such that the operations are more flexible. The first selection information may be acquired by the user by means of a select or input operation in a pop-up dialog box. In some embodiments, the user selects the first virtual machine, and therefore, the startup information is sent to the first virtual machine in the subsequent steps. Step 5011 may be optionally practiced. For example, when the host runs only two virtual machines, a first virtual machine and a second virtual machine, or a dedicated virtual machine on which the startup identifier is to be created is predetermined, it may be determined on which virtual machine the startup identifier is to be created, even without step 5011.

It should be noted that the technical solution according to this embodiment does not define the sequence of steps 201 and 5011.

Upon determining the startup information of the application on the second virtual machine, the virtualization layer host sends the startup information to the first virtual machine (the first virtual machine may be selected in step 5011).

Step 502: The first virtual machine receives the startup information sent by the virtualization layer host.

Step 503: A startup identifier associated with the startup information is created.

Step 504: A startup instruction for starting the application on the second virtual machine that is generated after the startup identifier is triggered is received receive via the first virtual machine.

Step 505: Startup information corresponding to the startup instruction is acquired, wherein the startup information includes information of the second virtual machine and information of the application on the second virtual machine.

Step 506: The second virtual machine is started according to the information of the second virtual machine.

Step 507: The application on the second virtual machine is started according to the information of the application on the second virtual machine.

Steps 502 to 507 herein are similar to steps 301 to 306 in the above embodiment.

Figure 6:
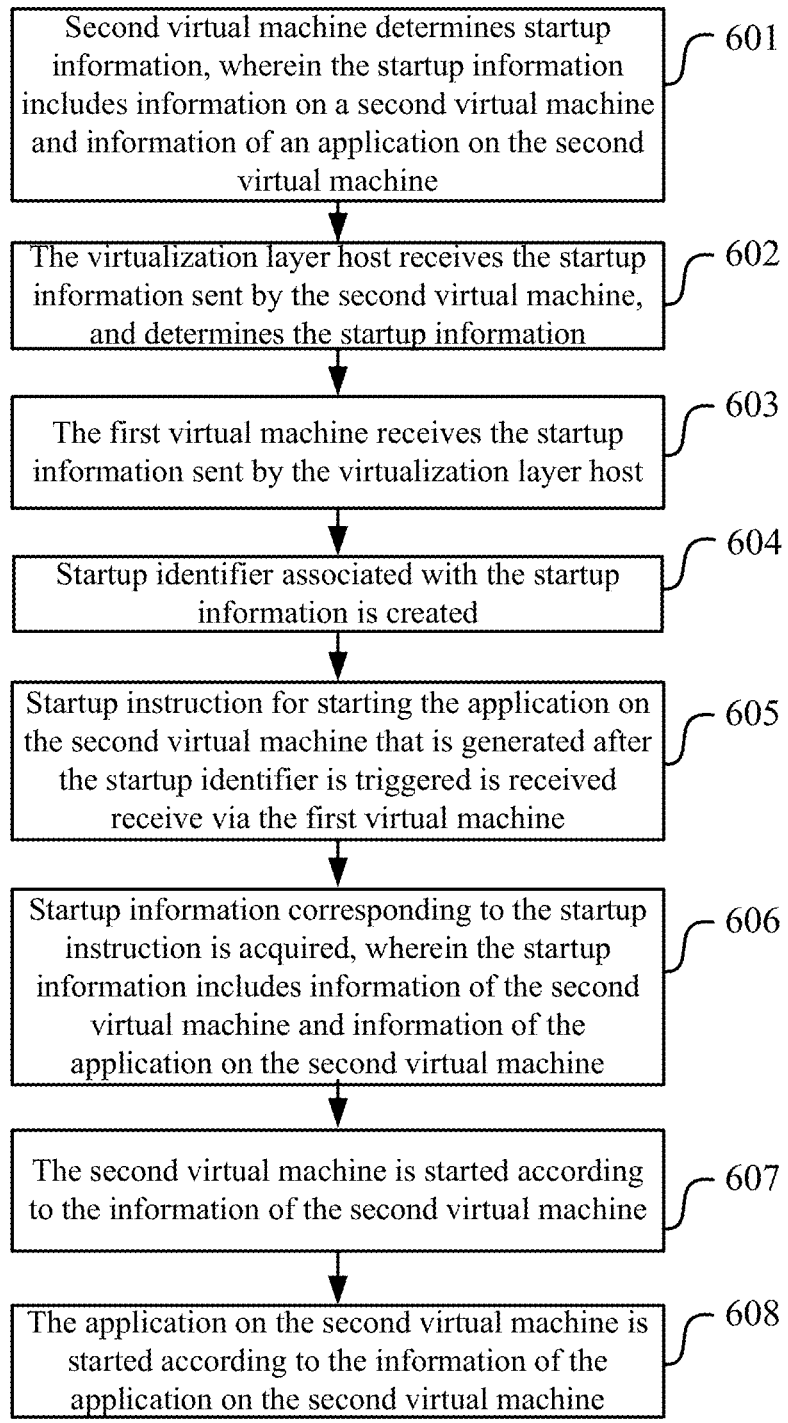
FIG. 6 illustrates a schematic flowchart of a method for starting an application according to an embodiment of the present disclosure.

FIG. 6 illustrates a schematic flowchart of a method for starting an application according to Embodiment 4 of the present disclosure. As illustrated in FIG. 6, the method includes the following steps:

Step 601: A second virtual machine determines startup information, wherein the startup information includes information of a second virtual machine and information of an application on the second virtual machine.

In step 601, a user initiates a process for creating a startup identifier in an operating environment of the second virtual machine. Creation of a startup identifier of an application on the second virtual machine may be initiated during installation of the application, or may be initiated by the user upon completion of installation of the application on the second virtual machine.

The startup information herein includes information of a second virtual machine and information of an application on the second virtual machine. The startup information needs to include related information of the second virtual machine and the application on the second virtual machine, such that the second virtual machine is capable of sending the related information to a virtualization layer host at one time, and then sending the related information to the first virtual machine. In this way, the first virtual machine is capable of acquiring the related information at one time, and the device is capable of constantly starting the second virtual machine and the application running on the second virtual machine.

Preferably, the information of the second virtual machine includes an identifier of the second virtual machine or a startup parameter of the second virtual machine.

Preferably, the information of the application on the second virtual machine includes an identifier of the application or execution information of the application.

Preferably, the process of starting to initiate the course of creating a startup identifier includes:

receiving, by the second virtual machine, second designation information, and determining the startup information according to the second designation information, the second designation information being configured to designate to create the startup identifier for the application.

The second designation information is used for designating for which application on the virtual machine an startup identifier is to be created on another virtual machine. That is, when a plurality of applications are installed on the virtual machine, the user may designate an application, such that the operations are more flexible. The first designation information may be acquired by the user by means of a selection or input operation in a pop-up dialog box, or by the user by means of designating a folder directory to batchwise designate applications under the folder directory (which facilitates subsequent batchwise acquisition of startup information of the applications in this installation directory). In some embodiments, the user selects an application, and startup information of the application running on the second virtual machine is determined according to the selection information. The step of designating an application is optional. For example, when only one application is installed on the second virtual machine, it may be directly determined for which application the startup identifier is to be created.

Preferably, the process of starting to initiate the course of creating a startup identifier includes:

determining, by the second virtual machine, the startup information during installation of the application.

According to predetermined configurations, in the course where the user installs an application on the second virtual machine, on another virtual machine, a startup identifier may be automatically created for the application being currently installed, and during the installation course, the user may also select whether to create the startup identifier.

Preferably, step 6011 is performed prior to step 602.

Step 6011: Prior to the receiving, by the virtualization layer host, the startup information sent by the second virtual machine, and determining the startup information, the method further includes: receiving, by the second virtual machine, second information, and selecting to create the startup identifier on the first virtual machine according to the second selection information.

In step 6011, the second selection information is used for selecting on which virtual machine the startup identifier is to be created, that is, when the host runs a plurality of virtual machines, the user may select on which virtual machine the startup identifier is to be created. The second selection information may be acquired by the user by means of a select or input operation in a pop-up dialog box. In some embodiments, the user selects the first virtual machine, and therefore, after the startup information is sent to the virtualization layer host in the subsequent steps, the virtualization layer host may forward the startup information to the first virtual machine. Step 6011 may be optionally practiced. For example, when the host runs only two virtual machines, a first virtual machine and a second virtual machine, or a dedicated virtual machine on which the startup identifier is to be created is predetermined, it may be determined on which virtual machine the startup identifier is to be created, even without step 6011.

It should be noted that the technical solution according to this embodiment does not define the sequence of steps 601 and 6011.

Upon determining the startup information of the application on the second virtual machine, the second virtual machine sends the startup information to the virtualization layer host.

Step 602: The virtualization layer host receives the startup information sent by the second virtual machine, and determines the startup information.

In step 602, the virtualization layer host receives the startup information sent by the second virtual machine, determines the startup information of the application on the second virtual machine, and sends the startup information to the first virtual machine.

Since the first virtual machine may be selected in step 6011, if the second virtual machine receives the second selection information in step 6011, the second virtual machine needs to send both the second selection information and the startup information to the virtualization layer host, such that the virtualization layer host forwards the startup information to the first virtual machine according to the second selection information.

Step 603: The first virtual machine receives the startup information sent by the virtualization layer host.

Step 604: A startup identifier associated with the startup information is created.

Step 605: A startup instruction for starting the application on the second virtual machine that is generated after the startup identifier is triggered is received receive via the first virtual machine.

Step 606: Startup information corresponding to the startup instruction is acquired, wherein the startup information includes information of the second virtual machine and information of the application on the second virtual machine.

Step 607: The second virtual machine is started according to the information of the second virtual machine.

Step 608: The application on the second virtual machine is started according to the information of the application on the second virtual machine.

Steps 603 to 608 herein are similar to steps 502 to 507 in the above embodiment.

Based on the same inventive concept, embodiments of the present disclosure provide an apparatus for starting an application. Since the principle based on which the apparatus solves the technical problem is similar to the principle used by the method for starting an application, practice of the apparatus may be referenced to practice of the method. The duplicate portions are not described herein any further.

Figure 7:
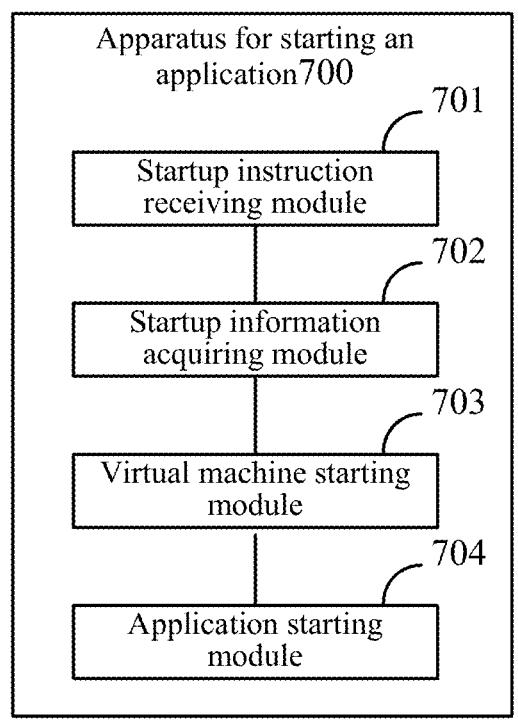
FIG. 7 illustrates a schematic structural diagram of an apparatus for starting an application according to an embodiment of the present disclosure.

FIG. 7 is a schematic structural diagram of an apparatus 700 for starting an application according to Embodiment 5 of the present disclosure.

The apparatus 700 for starting an application according to Embodiment 5 of the present disclosure includes:

a startup instruction receiving module 701, configured to receive, via a first virtual machine, a startup instruction for starting an application on a second virtual machine;

a startup information acquiring module 702, configured to acquire startup information corresponding to the startup instruction, the startup information including information of the second virtual machine and information of the application on the second virtual machine;

a virtual machine starting module 703, configured to start the second virtual machine according to the information of the second virtual machine; and an application starting module 704, configured to start the application on the second virtual machine according to the information of the application on the second virtual machine.

Preferably, the information of the second virtual machine includes an identifier of the second virtual machine or a startup parameter of the second virtual machine.

Preferably, the information of the application includes an identifier of the application, and the application starting module 704 is configured to determine execution information of the application according to an identifier of the application, and start the application on the second virtual machine according to the execution information of the application;

or the information of the application includes execution information of the application, and the application starting module 704 is configured to start the application on the second virtual machine according to the execution information of the application.

The apparatus for starting an application according to Embodiment 5 of the present disclosure corresponds to the method for starting an application according to Embodiment 1 of the present disclosure.

Figure 8:
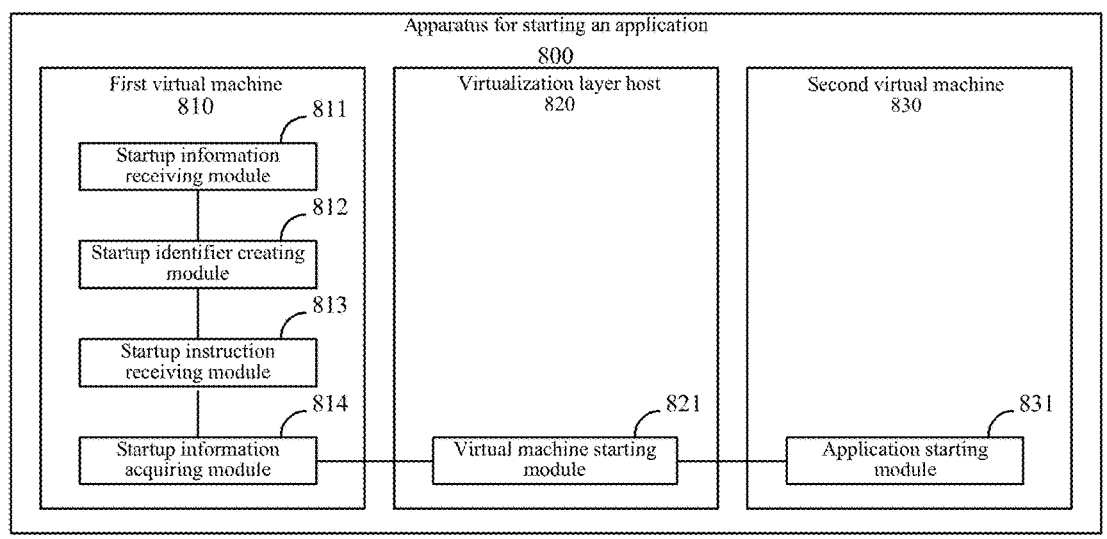
FIG. 8 illustrates a schematic structural diagram of an apparatus for starting an application according to an embodiment of the present disclosure.

FIG. 8 is a schematic structural diagram of an apparatus 800 for starting an application according to Embodiment 6 of the present disclosure.

The apparatus 800 for starting an application according to Embodiment 6 of the present disclosure includes:

a startup instruction receiving module 813, configured to receive, via a first virtual machine 710, a startup instruction for starting an application on a second virtual machine 830;

a startup information acquiring module 814, configured to acquire startup information corresponding to the startup instruction, the startup information including information of the second virtual machine 830 and information of the application on the second virtual machine 830;

a virtual machine starting module 821, configured to start the second virtual machine 830 according to the information of the second virtual machine 830; and an application starting module 831, configured to start the application on the second virtual machine 830 according to the information of the application on the second virtual machine 830.

The virtual machine starting module 821 is located on the virtualization layer host 820, and the application starting module 831 is located on the second virtual machine 830. The virtual machine starting module 821 receives startup information corresponding to the startup instruction sent by the startup information receiving module 814, and sends the information of the application on the second virtual machine 830 therein to the application starting module 831.

Preferably, the information of the second virtual machine 830 includes an identifier of the second virtual machine 830 and a startup parameter of the second virtual machine 830.

Preferably, the information of the application includes an identifier of the application, and the application starting module 831 is configured to determine execution information of the application according to an identifier of the application, and start the application on the second virtual machine 830 according to the execution information of the application;

or the information of the application includes execution information of the application, and the application starting module 831 is configured to start the application on the second virtual machine 830 according to the execution information of the application.

Preferably, the apparatus 800 for starting an application further includes:

a startup information receiving module 811, configured to receive the startup information; and a startup identifier creating module 812, configured to create a startup identifier associated with the startup information; wherein the startup instruction receiving module 813 is further configured to receive, via the first virtual machine, a startup instruction for starting the application on the second virtual machine 830 that is generated after the startup identifier is triggered; and the startup information receiving module 811, the startup identifier creating module 812 and the startup instruction receiving module 813 are located on the first virtual machine 810.

Preferably, the startup identifier creating module 812 is further configured to add a tag of the second virtual machine to the startup identifier.

The apparatus for starting an application according to Embodiment 6 of the present disclosure corresponds to the method for starting an application according to Embodiment 2 of the present disclosure.

Figure 9:
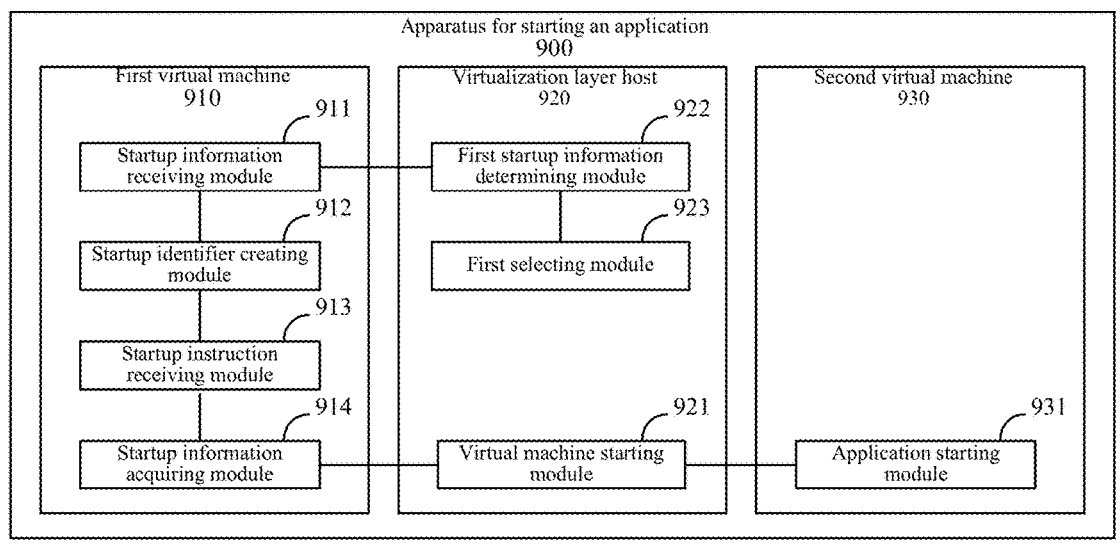
FIG. 9 illustrates a schematic structural diagram of an apparatus for starting an application according to an embodiment of the present disclosure.

FIG. 9 is a schematic structural diagram of an apparatus 900 for starting an application according to Embodiment 7 of the present disclosure.

The apparatus 900 for starting an application according to Embodiment 7 of the present disclosure includes:

a startup instruction receiving module 913, configured to receive, via a first virtual machine 910, a startup instruction for starting an application on a second virtual machine 930;

a startup information acquiring module 914, configured to acquire startup information corresponding to the startup instruction, the startup information including information of the second virtual machine 930 and information of the application on the second virtual machine 930;

a virtual machine starting module 921, configured to start the second virtual machine 930 according to the information of the second virtual machine 930; and an application starting module 931, configured to start the application on the second virtual machine 930 according to the information of the application on the second virtual machine 930.

The virtual machine starting module 921 is located on the virtualization layer host 920, and the application starting module 931 is located on the second virtual machine 930. The virtual machine starting module 921 receives startup information corresponding to the startup instruction sent by the startup information receiving module 914, and sends the information of the application on the second virtual machine 930 therein to the application starting module 931.

Preferably, the information of the second virtual machine 930 includes an identifier of the second virtual machine 930 and a startup parameter of the second virtual machine 930.

Preferably, the information of the application includes an identifier of the application, and the application starting module 931 is configured to determine execution information of the application according to an identifier of the application, and start the application on the second virtual machine 930 according to the execution information of the application;

or the information of the application includes execution information of the application, and the application starting module 931 is configured to start the application on the second virtual machine 930 according to the execution information of the application.

Preferably, the apparatus 900 for starting an application further includes:

a startup information receiving module 911, configured to receive the startup information; and a startup identifier creating module 912, configured to create a startup identifier associated with the startup information; wherein the startup instruction receiving module 913 is further configured to receive, via the first virtual machine, a startup instruction for starting the application on the second virtual machine 930 that is generated after the startup identifier is triggered; and the startup information receiving module 911, the startup identifier creating module 911 and the startup instruction receiving module 912 are located on the first virtual machine 913.

Preferably, the startup identifier creating module 912 is further configured to add a tag of the second virtual machine to the startup identifier.

Preferably, the apparatus 900 for starting an application further includes:

a first startup information determining module 922, configured to determine the startup information; wherein the first startup information determining module 922 is located on a virtualization layer host 920; and the startup information receiving module 911 is further configured to receive the startup information sent by the first startup information determining module 922.

Preferably, the apparatus 900 for starting an application further includes:

a first selecting module 923, configured to receive first selection information, and select to create the startup identifier on the first virtual machine 910 according to the first selection information; wherein the first selecting module 923 is located on the virtualization layer host 920.

Preferably, the first startup information determining module 922 is further configured to determine first designation information, and determine the startup information according to the first designation information, the first designation information being configured to designate to create the startup identifier for the application.

The apparatus for starting an application according to Embodiment 7 of the present disclosure corresponds to the method for starting an application according to Embodiment 3 of the present disclosure.

Figure 10:
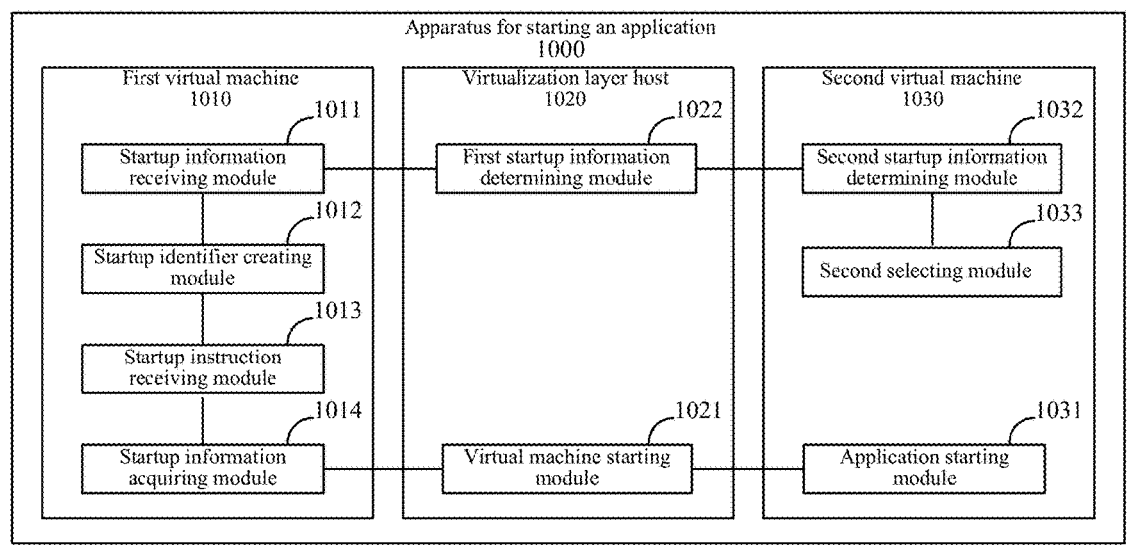
FIG. 10 illustrates a schematic structural diagram of an apparatus for starting an application according to an embodiment of the present disclosure.

FIG. 10 is a schematic structural diagram of an apparatus 1000 for starting an application according to Embodiment 8 of the present disclosure.

The apparatus 1000 for starting an application according to Embodiment 8 of the present disclosure includes:

a startup instruction receiving module 1013, configured to receive, via a first virtual machine 1010, a startup instruction for starting an application on a second virtual machine 1030;

a startup information acquiring module 1014, configured to acquire startup information corresponding to the startup instruction, the startup information including information of the second virtual machine 1030 and information of the application on the second virtual machine 1030;

a virtual machine starting module 1021, configured to start the second virtual machine 1030 according to the information of the second virtual machine 1030; and an application starting module 1031, configured to start the application on the second virtual machine 1030 according to the information of the application on the second virtual machine 1030.

The virtual machine starting module 1021 is located on the virtualization layer host 1020, and the application starting module 1031 is located on the second virtual machine 1030. The virtual machine starting module 1021 receives startup information corresponding to the startup instruction sent by the startup information receiving module 1014, and sends the information of the application on the second virtual machine 1030 therein to the application starting module 1031.

Preferably, the information of the second virtual machine 1030 includes an identifier of the second virtual machine 1030 and a startup parameter of the second virtual machine 1030.

Preferably, the information of the application includes an identifier of the application, and the application starting module 1031 is configured to determine execution information of the application according to an identifier of the application, and start the application on the second virtual machine 1030 according to the execution information of the application;

or the information of the application includes execution information of the application, and the application starting module 1031 is configured to start the application on the second virtual machine 1030 according to the execution information of the application.

Preferably, the apparatus 1000 for starting an application further includes:

a startup information receiving module 1011, configured to receive the startup information; and a startup identifier creating module 1012, configured to create a startup identifier associated with the startup information; wherein the startup instruction receiving module 1013 is further configured to receive, via the first virtual machine, a startup instruction for starting the application on the second virtual machine 1030 that is generated after the startup identifier is triggered: and the startup information receiving module 1011, the startup identifier creating module 1012 and the startup instruction receiving module 1013 are located on the first virtual machine 1010.

Preferably, the startup identifier creating module 1012 is further configured to add a tag of the second virtual machine to the startup identifier.

Preferably, the apparatus 1000 for starting an application further includes:

a first startup information determining module 1022, configured to determine the startup information; wherein the first startup information determining module 1022 is located on a virtualization layer host 1020; and the startup information receiving module 1011 is further configured to receive the startup information sent by the first startup information determining module 1022.

Preferably, the apparatus 1000 for starting an application further includes:

a first selecting module 1023, configured to receive first selection information, and select to create the startup identifier on the first virtual machine 1010 according to the first selection information; wherein the first selecting module 1023 is located on the virtualization layer host 1020.

Preferably, the first startup information determining module 1022 is further configured to determine first designation information, and determine the startup information according to the first designation information, the first designation information being configured to designate to create the startup identifier for the application.

Preferably, the apparatus 1000 for starting an application further includes:

a second startup information determining module 1032, configured to determine the startup information; wherein the second startup information determining module 1032 is located on the second virtual machine 1030; and the first startup information determining module 1022 is further configured to receive the startup information sent by the second startup information receiving module 1032, and determine the startup information.

Preferably, the apparatus 1000 for starting an application further includes:

a second selecting module 1033, configured to receive second selection information, and select to create the startup identifier on the first virtual machine 1010 according to the second selection information; wherein the second selecting module 1033 is located on the second virtual machine 1030.

Preferably, the second startup information determining module 1032 is further configured to determine second designation information, and determine the startup information according to the second designation information, the second designation information being configured to designate to create the startup identifier for the application;

or the second startup information determining module 1032 is further configured to determine the startup information during installation of the application.

The apparatus for starting an application according to Embodiment 8 of the present disclosure corresponds to the method for starting an application according to Embodiment 4 of the present disclosure.

In the above embodiments, the apparatus may be practiced by using conventional function elements or devices. For example, the processing module may be practiced by using a conventional data processing element or device, and at least the function element or device may be configured on a positioning server employed in the existing positioning technology; the receiving module is an element or device that is configured on any device having the signal transmission function; and A and n parameter calculation, intensity adjustment and the like practiced by the processing module are all conventional technical means, and a person skilled in the art may practice the functions via corresponding designs and developments.

For ease of description, in the description, various parts of the above apparatuses are divided into various modules or units according to function for separate description. Nevertheless, the function of each module or unit is implemented in the same or a plurality of software and/hardware when the present disclosure is practiced.

Figure 11:
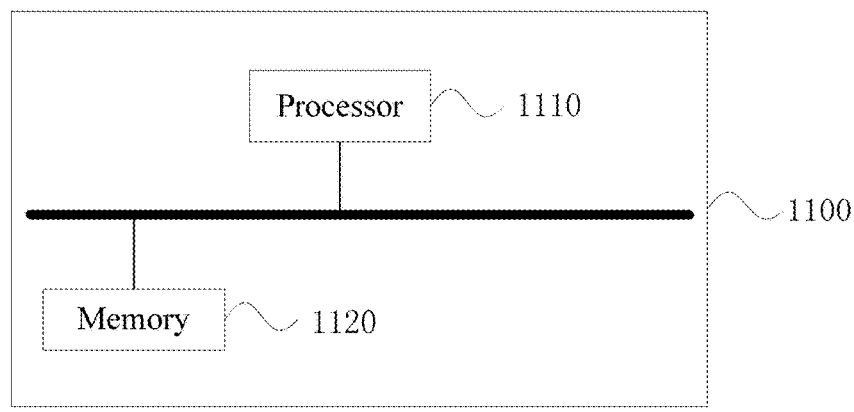
FIG. 11 illustrates a schematic structural diagram of an electronic device for starting an application according to an embodiment of the present disclosure.

FIG. 11 is a schematic structural diagram of an electronic device 1100 for starting an application according to an embodiment of the present disclosure. The electronic device includes: a processor 1110 and a memory 1120. The memory 1120 is communicably connected with the processor 1110. The memory 1120 is configured to store programs, and the processor 1110 is configured to execute the programs stored in the memory 1120, the programs includes:

a startup instruction receiving module, configured to receive, via a first virtual machine, a startup instruction for starting an application on a second virtual machine;

a startup information acquiring module, configured to acquire startup information corresponding to the startup instruction, the startup information including information of the second virtual machine and information of the application on the second virtual machine;

a virtual machine starting module, configured to start the second virtual machine according to the information of the second virtual machine; and an application starting module, configured to start the application on the second virtual machine according to the information of the application on the second virtual machine.

The programs further includes other modules, configured to perform the aforesaid methods for starting an application. For brevity of description, the details are not given herein any further.

Those skilled in the art shall understand that the embodiments may be described as illustrating methods, systems, or computer program products. Therefore, hardware embodiments, software embodiments, or hardware-plus-software embodiments may be used to illustrate the present disclosure. In addition, the present disclosure may further employ a computer program product which may be implemented by at least one non-transitory computer-readable storage medium with an executable program code stored thereon. The non-transitory computer-readable storage medium includes, but not limited to, a disk memory, a CD-ROM, and an optical memory.

The present disclosure is described based on the flowcharts and/or block diagrams of the method, device (system), and computer program product. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored a non-transitory computer-readable memory capable of causing a computer or other programmable data processing devices to work in a specific mode, such that the instructions stored on the non-transitory computer-readable memory implement a product including an instruction apparatus, wherein the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing, devices, implement the specific functions in at least one process in the flowcharts and/or at least one block in the block diagrams.

Although preferred embodiments of the present disclosure are described, those skilled in the art may make modifications and variations to these embodiments based on the basic inventive concept of the present disclosure. Therefore, the preferred embodiments and all such modifications and variations shall fall within the protection scope subject to the appended claims.

What is claimed is:

1. A method for starting an application, comprising:
   receiving, by a first virtual machine, startup information and creating a startup identifier associated with the startup information;
   receiving, via the first virtual machine, a startup instruction for starting an application on a second virtual machine;
   acquiring the startup information corresponding to the startup instruction, the startup information comprising information of the second virtual machine and information of the application on the second virtual machine;
   starting the second virtual machine according to the information of the second virtual machine; and
   starting the application on the second virtual machine according to the information of the application on the second virtual machine;
   wherein the receiving, via the first virtual machine, the startup instruction for starting the application on the second virtual machine comprises:
   receiving, via the first virtual machine, the startup instruction for starting the application on the second virtual machine that is generated after the startup identifier is triggered;
   wherein the receiving, by the first virtual machine, the startup information comprises:
   determining, by a virtualization layer host, the startup information; and
   receiving, by the first virtual machine, the startup information sent by the virtualization layer host;
   wherein prior to the receiving, by the first virtual machine, the startup information sent by the virtualization layer host, the method further comprises:
   receiving, by the virtualization layer host, first selection information, and selecting to create the startup identifier on the first virtual machine according to the first selection information; and
   wherein the first selection information is used for selecting on which virtual machine the startup identifier is to be created, and the first selection information is acquired by means of a select or input operation in a pop-up dialog box.

2. The method according to claim 1, wherein the information of the second virtual machine comprises an identifier of the second virtual machine or a startup parameter of the second virtual machine.

3. The method according to claim 1, wherein the information of the application comprises an identifier of the application, and
   the starting the application on the second virtual machine according to the information of the application on the second virtual machine comprises: determining execution information of the application according to the identifier of the application, and starting the application on the second virtual machine according to the execution information of the application;
   or
   the information of the application comprises execution information of the application, and
   the starting the application on the second virtual machine according to the information of the application on the second virtual machine comprises: starting the application on the second virtual machine according to the execution information of the application.

4. The method according to claim 1, wherein the creating the startup identifier associated with the startup information comprises:
adding a tag of the second virtual machine to the startup identifier.

5. The method according to claim 1, wherein the determining, by the virtualization layer host, the startup information comprises:
receiving, by the virtualization layer host, first designation information, and determining the startup information according to the first designation information, wherein the first designation information being configured to designate to create the startup identifier for the application.

6. The method according to claim 1, wherein prior to the determining, by the virtualization layer host, the startup information, the method further comprises:
determining, by the second virtual machine, the startup information; and
receiving, by the virtualization layer host, the startup information sent by the second virtual machine, and determining the startup information.

7. The method according to claim 6, wherein prior to the receiving, by the virtualization layer host, the startup information sent by the second virtual machine, and determining the startup information, the method further comprises:
receiving, by the second virtual machine, second information, and selecting to create the startup identifier on the first virtual machine according to the second selection information.

8. The method according to claim 6, wherein the determining, by the second virtual machine, the startup information comprises:
receiving, by the second virtual machine, second designation information, and determining the startup information according to the second designation information, wherein the second designation information being configured to designate to create the startup identifier for the application;
or
determining, by the second virtual machine, the startup information during installation of the application.

9. An electronic device for starting an application, comprising:
at least one processor; and
a memory communicably connected with the at least one processor and storing one or more programs executable by the at least one processor, the one or more programs comprising:
a startup information receiving module, configured to receive a startup information; and
a startup identifier creating module, configured to create a startup identifier associated with the startup information;
a startup instruction receiving module, configured to receive, via a first virtual machine, a startup instruction for starting an application on a second virtual machine;
a startup information acquiring module, configured to acquire the startup information corresponding to the startup instruction, the startup information comprising information of the second virtual machine and information of the application on the second virtual machine;

a virtual machine starting module, configured to start the second virtual machine according to the information of the second virtual machine; and
an application starting module, configured to start the application on the second virtual machine according to the information of the application on the second virtual machine;
wherein the startup instruction receiving module is further configured to receive, via the first virtual machine, the startup instruction for starting the application on the second virtual machine that is generated after the startup identifier is triggered; and
the startup information receiving module, the startup identifier creating module and the startup instruction receiving module are located on the first virtual machine;
wherein the one or more programs further comprises:
a first startup information determining module, configured to determine the startup information; wherein the first startup information determining module is located on a virtualization layer host;
the startup information receiving module is further configured to receive the startup information sent by the first startup information determining module; and
a first selecting module, configured to receive first selection information, and select to create the startup identifier on the first virtual machine according to the first selection information; wherein the first selecting module is located on the virtualization layer host, and wherein the first selection information is used for selecting on which virtual machine the startup identifier is to be created, and the first selection information is acquired by means of a select or input operation in a pop-up dialog box.

10. The apparatus according to claim 9, being wherein the information of the second virtual machine comprises an identifier of the second virtual machine or a startup parameter of the second virtual machine.

11. The electronic device according to claim 9, wherein the information of the application comprises an identifier of the application, and the application starting module is configured to
determine execution information of the application according to the identifier of the application, and start the application on the second virtual machine according to the execution information of the application;
or
the information of the application comprises execution information of the application, and
the application starting module is configured to start the application on the second virtual machine according to the execution information of the application.

12. The electronic device according to claim 9, wherein the startup identifier creating module is further configured to add a tag of the second virtual machine to the startup identifier.

13. The electronic device according to claim 9, wherein the first startup information determining module is further configured to determine first designation information, and determine the startup information according to the first designation information, the first designation information being configured to designate to create the startup identifier for the application.

14. The electronic device according to claim 9, wherein the one or more programs further comprises:
a second startup information determining module, configured to determine the startup information; wherein the second startup information determining module is located on the second virtual machine; and the first startup information determining module is further configured to receive the startup information sent by the second startup information receiving module, and determine the startup information.

15. The electronic device according to claim 14, wherein the one or more programs further comprises:

a second selecting module, configured to receive second selection information, and select to create the startup identifier on the first virtual machine according to the second selection information; wherein the second selecting module is located on the second virtual machine.

16. The electronic device according to claim 14, wherein the second startup information determining module is further configured to determine second designation information, and determine the startup information according to the second designation information, the second designation information being configured to designate to create the startup identifier for the application;

or the second startup information determining module is further configured to determine the startup information during installation of the application.

* * * * *